United States Patent [19]
Jensen

[11] Patent Number: 5,897,610
[45] Date of Patent: Apr. 27, 1999

[54] ELECTRO OPTICAL BOARD ASSEMBLY FOR MEASURING THE TEMPERATURE OF AN OBJECT SURFACE FROM INFRA RED EMISSIONS THEREOF INCLUDING AN AUTOMATIC GAIN CONTROL THEREFORE

[75] Inventor: Earl M. Jensen, Sunnyvale, Calif.

[73] Assignee: Luxtron Corporation, Santa Clara, Calif.

[21] Appl. No.: 08/938,138

[22] Filed: Sep. 26, 1997

Related U.S. Application Data

[62] Division of application No. 08/312,146, Sep. 26, 1994, Pat. No. 5,717,608.

[51] Int. Cl.⁶ .................................................. G01J 5/10
[52] U.S. Cl. ........................................ 702/134; 702/130
[58] Field of Search ................................... 702/130, 134, 702/189; 374/130–132; 250/338.1, 339.01, 339.03, 339.11, 339.14

[56] References Cited

U.S. PATENT DOCUMENTS

| | | |
|---|---|---|
| 4,427,306 | 1/1984 | Adamson . |
| 4,576,486 | 3/1986 | Dils . |
| 4,636,736 | 1/1987 | Woodworth et al. . |
| 4,644,323 | 2/1987 | Chamran et al. . |
| 4,718,036 | 1/1988 | Halbert et al. . |
| 4,750,139 | 6/1988 | Dils . |
| 4,771,175 | 9/1988 | Sirieix et al. . |
| 4,845,647 | 7/1989 | Dils et al. . |
| 4,867,574 | 9/1989 | Jenkofsky ........................... 374/121 |
| 4,900,162 | 2/1990 | Beckman et al. ................... 374/132 |
| 4,926,227 | 5/1990 | Jensen . |
| 5,103,230 | 4/1992 | Kalthoff et al. . |
| 5,154,512 | 10/1992 | Schietinger et al. . |
| 5,166,080 | 11/1992 | Schietinger et al. . |
| 5,169,234 | 12/1992 | Böhm . |
| 5,194,865 | 3/1993 | Mason et al. . |
| 5,227,631 | 7/1993 | Hunter . |
| 5,241,310 | 8/1993 | Tiemann . |
| 5,246,292 | 9/1993 | Gal et al. ........................... 374/121 |
| 5,310,260 | 5/1994 | Schietinger et al. . |
| 5,717,608 | 2/1998 | Jensen ................................ 702/130 |

FOREIGN PATENT DOCUMENTS

| | | |
|---|---|---|
| 0519105 | 3/1992 | European Pat. Off. . |
| 55-031937 | 8/1980 | Japan . |

OTHER PUBLICATIONS

Article entitled: "Low Noise, Dual Switched Integrator," Burr–Brown, (ACF2101), Mar., 1991, pp. 1–12.

Primary Examiner—John Barlow
Assistant Examiner—Craig Steven Miller
Attorney, Agent, or Firm—Majestic, Parsons, Siebert & Hsue

[57] ABSTRACT

An automatic gain control technique integrates samples of an incoming analog signal a controlled amount of time so that the magnitudes of the samples lie within the desired input window of an analog-to-digital converter or other signal processing device. The values of the samples are then determined from a combination of the output of the signal processing device and their integration time. This is utilized in a system for determining the temperature of a surface of an object, without contacting the surface, by measuring the level of its infra-red radiation emission. A particular application of the system is to measure the temperature of a semiconductor wafer within a processing chamber while forming integrated circuits on it. The measuring system is configured on a single printed circuit board with an extra height metal heat sink structure to which a cooling unit is mounted. A photodetector and a circuit chip which performs the signal integrations are mounted within the cooling unit and operated at a uniform temperature. The combination of the variable time integration and cooling techniques greatly increases the signal-to-noise ratio of the measuring system. This allows surface temperature measurements to be made down to about 250° C. by measuring object emissions at slightly less than one micron in wavelength, conditions which provide signal levels which are normally too weak to measure accurately.

1 Claim, 5 Drawing Sheets

ELECTRO OPTICAL BOARD ASSEMBLY FOR MEASURING THE TEMPERATURE OF AN OBJECT SURFACE FROM INFRA RED EMISSIONS THEREOF INCLUDING AN AUTOMATIC GAIN CONTROL THEREFORE

This is a division of application Ser. No. 08/312,146, filed Sep. 26, 1994 now U.S. Pat. No. 5,717,608.

BACKGROUND OF THE INVENTION

This invention relates generally to electronic automatic gain control techniques, and, more specifically, to the use of such techniques in the measurement of a level of infra-red radiation emitted by an object surface whose temperature is being measured.

There are many applications where the intensity of the emission from an object surface of infra-red radiation is detected by a photodetector and measured in order to determine the temperature or some other parameter of the object surface. One such application utilizes a small blackbody cavity formed on an end of an optical fiber as a temperature sensor, emissions from the cavity being transmitted to a photodetector at the other end of the optical fiber. The temperature of the environment in which the black-body sensor is positioned is thus measured. An example of such a system is disclosed in U.S. Pat. No. 4,750,139. Since the intensity level of the infra-red emissions varies considerable over a temperature range of interest, as much as an order of magnitude or more, an automatic gain control circuit is used in a front end of a measuring instrument in order to maintain a temperature proportional analog signal at a level within a desired input range of an analog-to-digital converter (DAC) or other signal processing device. The automatic gain control is typically formed of an analog circuit including at least one amplifier whose gain is set through a switched resistor network.

Pyrometers have also been used for a long period of time for measuring the temperature of a surface without having any contact with that surface. Infra-red emissions from the surface are remotely imaged onto a photodetector and processed in order to determine the surface temperature. More recently, optical fibers or other light pipes are used as part of the infra-red radiation transmission and imaging system.

One important current application of such non-contact temperature measurement is in the field of the formation of integrated circuits. Several steps of forming an integrated circuit on a semi-conductor wafer are performed within a reaction chamber. The temperature of the wafers is rapidly cycled through a predetermined temperature profile in a class of processes referred to as rapid thermal processing (RTP). The necessity to follow predetermined temperature profiles during the time of processing is a result of the very small dimensions of the various regions and components of the integrated circuits so formed. Accurate, real time measurement of the wafer's temperature is thus quite important to the success of RTP.

Almost all semi-conductor processing is performed on silicon wafers. Silicon has the characteristic of being transparent to radiation having a wavelength in excess of about one micron. Therefore, it is usually desired to measure the level of infra-red emissions from a silicon wafer at a wavelength of less than one micron. Heretofore, such a technique has been useable to measure temperatures only down to about 500° C. This is because the infra-red emissions from the wafer surface, as with any such surface, drop to a level that is so low at low temperatures that current techniques cannot accurately measure the emissions. The signal-to-noise ratio becomes quite low, making accurate measurements very difficult.

Therefore, it is a principle object of the present invention to provide individual techniques and a combination of techniques which allow making such temperature measurements with improved accuracy.

It is a specific object of the present invention to provide individual techniques and a combination of techniques for allowing the measurement of semi-conductor wafer temperatures by monitoring emission wavelengths less than one micron of temperatures in wider ranges than now possible to be made with a high degree of accuracy.

It is a more general object of the present invention to provide an improved automatic gain control technique for use in the front end of instruments used to make such measurements.

It is an even more general object of the present invention to provide a technique for digitizing analog signals which can vary over a range that is much larger than a preferred input range to an analog-to-converter or other signal processing device.

It is an additional object of the present invention to provide an improved physical arrangement of optical and electronic components for detecting the level of radiation emissions.

SUMMARY OF THE INVENTION

A first aspect of the present invention is an improved automatic gain control (AGC) technique that varies a characteristic of the integration of an electrical signal output of a photodetector receiving such radiation emissions in order to control the magnitude of a signal applied to a device having a limited input signal range, such as an analog-to-digital converter. The integrating technique preferably uses only capacitors as components, avoiding any significant amount of resistance in the integrating circuit in order to minimize noise generated by the circuit. A measure of the radiation level striking the photodetector is a combination of the analog-to-digital output and a characteristic of the integrator that is varied in response to the magnitude of the signal presented, integration time being the preferred characteristic that is controlled. In addition to the pyrometric application of this signal processing technique, it also has applications elsewhere when a need exists to measure a signal capable of such a wide variation. Further, in other applications, the technique is applicable to digitizing an analog signal, whether it has a wide variation or not.

According to another aspect of the present invention, the photodetector and integrating electronic circuit chip are mounted together within a temperature controlled chamber which is maintained at a uniform cool temperature, thus further reducing generation of noise thereby. Such a chamber is preferably mounted on a metallic heat sink surface which is shaped to have a large heat dissipating area as well as being mounted on a standard printed circuit board without seriously impeding the space for normal mounting of electronic components directly on the printed circuit board. It is also preferred that the infra-red signals be communicated by an optical fiber directly to the photodetector.

The combining of integration as an automatic gain control and the maintaining of the photodetector and integrating electronic circuit chip at a cool, uniform temperature provide an instrument that is capable of measuring temperatures down to about 250° C. at an infra-red emission wavelength of slightly less than one micron. The measurements are performed with a high degree of accuracy and a good signal to noise ratio. This technique thus has a significant application to the monitoring of semiconductor wafer temperatures during rapid thermal processing of them. Accurate temperature measurements are obtained with these techniques over a range of about 250° C. to 1200° C.

Additional objects, advantages and features of the various and several different aspects of the present invention are best understood by reference to the following description of its preferred embodiments, which description should be taken in conjunction with the accompanying drawings.

DESCRIPTION OF THE PREFERRED EMBODIMENTS

Figure 1A:
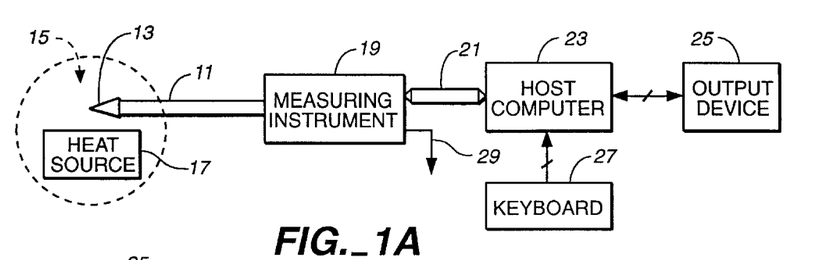
FIGS. 1A and 1B generally illustrate temperature measurement applications in which the various aspects of the present invention have particular utility.

One application of the various embodiments of the present invention is shown in the schematic diagram of FIG. 1A. A length of optical fiber 11 is provided at one end with a black-body cavity 13 attached to the fiber. Example black-body structures of this type are disclosed in U.S. Pat. No. 4,576,486 and allowed U.S. application Ser. No. 07/874,829, filed Apr. 28, 1992 now U.S. Pat. No. 5,364,186, the disclosure of which is incorporated herein by this reference. The black-body cavity 13 is positioned within an environment 15 whose temperature is to be measured, usually an enclosed space being heated by a heat source 17. The black-body cavity 13 is thus heated to the temperature of the environment 15 in which it is placed. Infra-red radiation emissions of the black-body 13 are communicated out of the environment 15 though the optical fiber 11. The spectrum and relative intensities of these emissions as a function of the temperature of the black body 13 can be ascertained from well known principles.

This temperature dependent infra-red radiation emission is communicated by the optical fiber 11 to a measuring instrument 19. It is this instrument which includes embodiments of the present invention described below. Briefly, a photodetector converts the infra-red emissions received from the black-body cavity 13. An electrical signal output of the photodetector is electronically processed in order to output signals which indicate the temperature of the black-body 13. One output 21 carries that temperature measurement signal in digital form to a host computer system 23 or other utilization device. Such a host computer system includes a usual output device 25 for communicating the temperature measurement, and an input device such as a keyboard 27. A second output 29 of the instrument 19 provides an analog signal proportional to the temperature of the black-body cavity 13. Either the digital output 21 or analog output 29 can, in addition to simply providing an indication of the temperature within the environment 15, be used to control the heat source 17 or some other parameter of a process in response to that temperature.

Figure 1B:
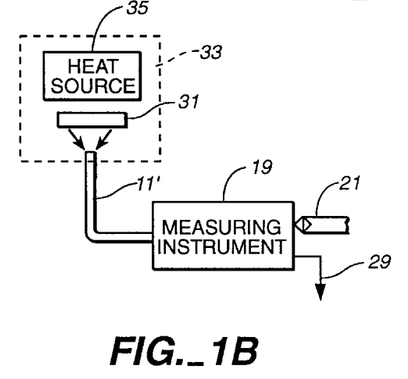

Another application of black-body temperature measurement techniques is illustrated in FIG. 1B. In this case, rather than having a black-body cavity attached to an end of the optical fiber, a length of optical fiber 11' receives infra-red emissions directly from a surface of an object 31 whose temperature is to be determined. The bare end of the optical fiber 11' can serve to gather radiation emitted from the object 31, or can be supplemented by the use of lenses or other optical elements (not shown) to gather a larger field of radiation emissions into the end of the optical fiber 11'. An example application of the technique of FIG. 1B is where the object 31 is a semi-conductor wafer being processed within a processing chamber 33. As part of that process, the temperature of the wafer 31 is carefully controlled by some heat source 35. The ability to be able to monitor the temperature of the wafer itself is becoming increasingly important with advanced semi-conductor processing technology. The type of heat source 31 utilized in such processes is selected from heating lamps, radio frequency sources, and the like.

Figure 2:
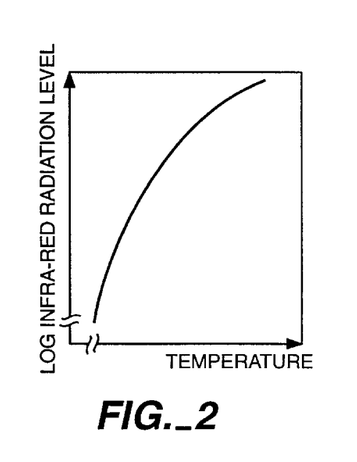
FIG. 2 is a curve showing the intensity of an infra-red radiation emission from an object surface as a function of that surface's temperature.

Referring to FIG. 2, an example characteristic curve is given which relates the intensity of a defined bandwidth of infra-red radiation emissions (x-axis) with the temperature (y-axis) of the object whose emissions are being measured. Various commercial pyrometers are calibrated to a specific curve of the type of FIG. 2 which is derived from well known Plank's black-body emission characteristics. Such a curve, when used in a measuring instrument such as the instrument 19, is calibrated to take into account the emissivity of the surface that is emitting the infra-red radiation being detected.

It will be noted from the example curve of FIG. 2 that the radiation level (x-axis) is a logarithmic scale. A measuring instrument must thus be able to handle an incoming optical signal having an intensity that varies over an extremely wide range, often by an order of magnitude (ten times) or more.

A typical pyrometric temperature measuring instrument digitizes the detected optical signal in order to measure where on the curve of FIG. 2 the emission level exists. Typically, an analog-to-digital converter used in such instruments has a linear input range that is much smaller than that of the detected optical signal over the full temperature range of the measuring instrument. Thus, some form of automatic gain control circuitry is utilized to keep the incoming signal within this operating window of the analog-to-digital converter. This is usually accomplished by the use of amplifiers having switched resistor networks to adjust the amplifier gain. Such use of resistors inherently generates electrical noise. This and noise generated by the photodetector itself has limited how low a temperature can be measured by such an instrument It is at the lower temperatures that the optical signal is low, and thus the electrical signal output of the photodetector which is being processed is low with respect to noise being generated in the circuit.

Figure 3:
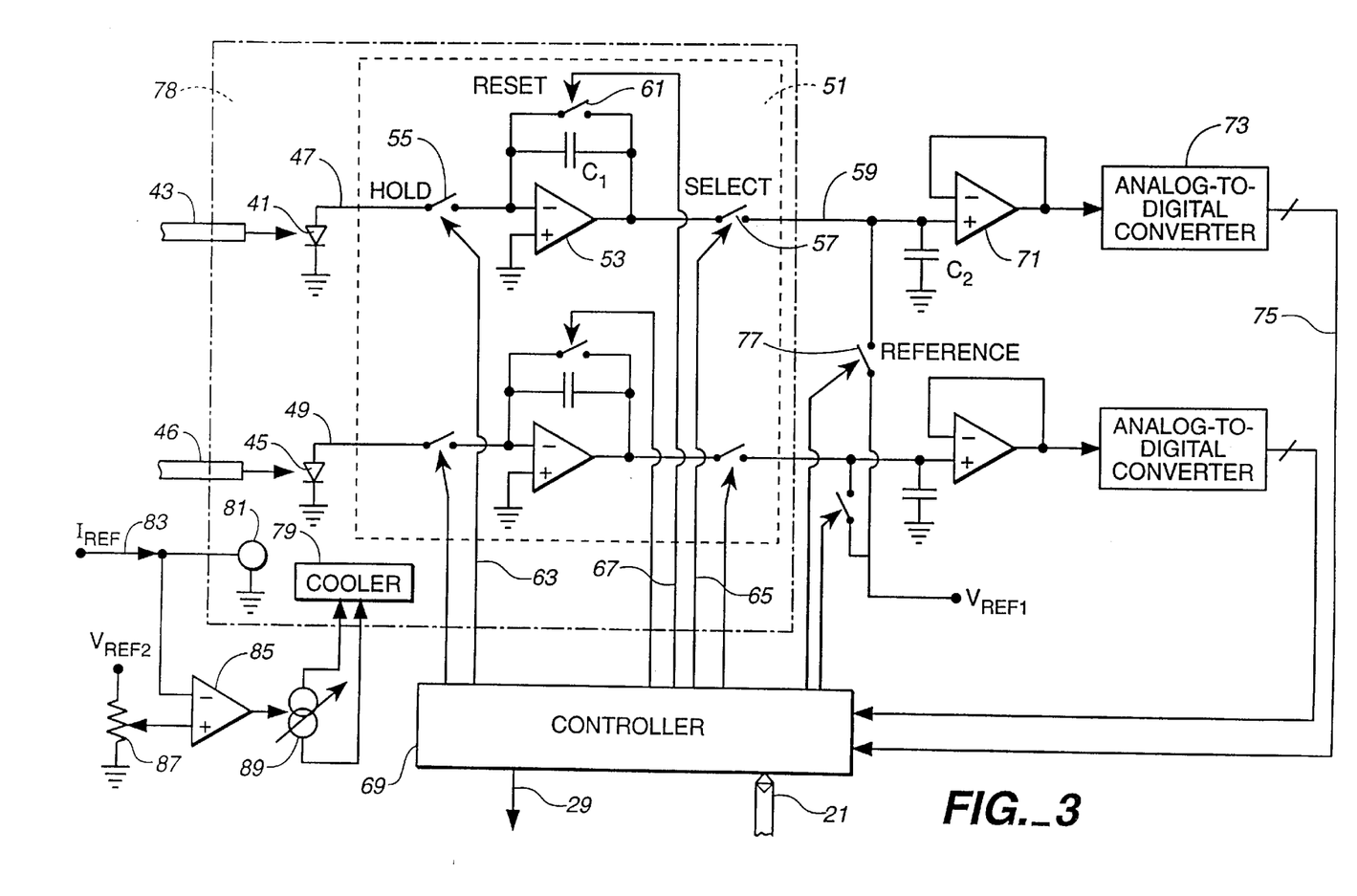
FIG. 3 is an electronic circuit diagram of a front end portion of a measuring instrument which utilizes an integration technique for automatic gain control.

Therefore, the present invention includes a significant departure from the usual automatic gain control technique, an implementation thereof being shown in the schematic diagram of FIG. 3. The example shown in FIG. 3 has two signal channels A photodetector 41 receives an optical signal from an optical fiber 43, and a photodetector 45 receives an optical signal from an optical fiber 46. Output signals of the photodetectors in respective lines 47 and 49 are applied to a commercially available integrated circuit chip 51 which contains two identical integrating circuits. The structure and operation of only one channel and integrating circuit is described herein, it being recognized that the other channel is the same.

One channel of the circuit chip 51 includes a differential amplifier 53 having a feedback capacitor C1 connected between its output and an inverting input. A non-inverting input is connected to ground potential An electrical signal output of the photodetector 41 is connected through a hold switch 55 to the inverting input of the amplifier 53. Its output is connected though a select switch 57 to form an output in a line 59 of the chip 51. A reset switch 61 is connected across the feedback capacitor C1. Each of the switches 55, 57 and 61 is operated between conductive and non-conductive states in response to respective control signals in lines 63, 65 and 67 from outside of the circuit chip 51, such as from a controller 69. The circuit chip 51 is preferably part number ACF2101 from the Burr-Brown Corporation.

The integrator operates, when its hold switch 55 is closed and its reset switch 61 and select switch 57 are opened, to accumulate a charge in its capacitor C1 having a magnitude dependent upon the level of current flowing in line 47 from the photodetector 41 and the amount of time that the hold switch 55 is closed. The current flowing in the line 47 is proportional to the level of the optical signal striking the photodetector 41 through the optical fiber 43. After that step, the charge on the capacitor C1 is transferred to another capacitor C2 that is outside of the integrator chip 51 by closing the select switch 57 while the hold switch 55 and the reset switch 61 are opened. The charge in the capacitor C2 is then amplified by a buffer amplifier 71, whose output becomes an input to an analog-to-digital converter 73. A digital output in lines 75 is connected back to the controller 69. The digital signal in line 75 gives a measure of the intensity of the infra-red radiation striking the photodetector 41 during the initial integration cycle. Once such a sample is acquired, the reset switch 61 is closed to discharge the capacitor C1 and another integrating cycle begun.

The temperature of the object emitting the radiation which was detected is determined by the controller from the digital signal on the line 75. The controller includes an integral of Plank's black-body curve which has been corrected for the transfer characteristics of the photodiode 41. This is a curve similar to that shown in FIG. 2. Alternatively, the the information of such a curve can be contained in a look-up table within memory of the controller 69. In either case, that information allows the controller to convert the infra-red radiation intensity given in lines 71, when combined with the time that the hold switch 55 was held closed by a control signal in the line 63 to acquire the samples in order to ascertain the emitting object's temperature. The controller 69 closes the hold switch 55 for a length of time during the acquisition of each sample which results in the measurement signal in line 75 indicating that an input to the analog-to-digital converter 73 is within a desired window of operation wherein the ADC is most linear. If the ADC output signal in line 75 indicates that its input is beyond that desired window, then the controller 69 adjusts the time that the hold switch 55 is maintained closed when acquiring the next sample. Although the controller 69 can calculate temperature each time a new sample of the incoming signal is acquired, it is preferable to first average the values of many samples and then apply them against the black-body curve or look-up table.

The variation of integration time in response to the measurements operates provides the automatic gain control (AGC) function. Integration time, however, is not the only integration characteristic which can be controlled. Alternatively, the integration time could be held fixed while the value of the feedback capacitor C1 is varied. A combination of varying integration time and the size of the capacitor C1 could even be implemented. However, the ability to vary the capacitor C1 requires a switched capacitor network which consumes a great deal of space on the circuit chip, and, for that reason, is not preferred.

In order to compensate for gain variations in the buffer amplifier 71 which will occur over time and under different operating conditions, it's non-inverting input is periodically connected through a switch 77 to a reference voltage source $V_{REF1}$ while the select switch 57 is held open. The voltage $V_{REF1}$ is that which the analog-to-digital converter 73 requires for such a reference adjustment. Once the measurement at the output of the buffer amplifier 71 has been made when connected to this reference voltage source, future readings are then adjusted by the analog-to-digital converter 73 to compensate for any error that exists. Another compensation is performed, as described below, to correct for any offsets introduced into the signal by the integration circuit, and perhaps also by the photodetector. Each of these reference and offset measurements is periodically made in order to ascertain correction factors which are thereafter applied to the data acquired until the next such measurements are made.

It will be noted that the signal path of FIG. 3 from the photodetector to the digital-to-analog 73 contains no resistors. This eliminates a source of noise which becomes significant when dealing with low-level signals. Rather than adjusting a level of amplification in such front-end circuits by switching resistors and feedback groups of amplifiers, as is normally done to adjust the signal level within a desired window of the analog-to-digital converter 73, the integration time is controlled instead. That is, the length of time that the hold switch 55 remains closed during the acquisition of one sample controls the level of voltage that the output of the buffer amplifier 71 to be within the desired range. Physically, in order to further reduce any noise generation within these front-end circuits, the integration chip 51 and the photodetectors 41 and 45 are contained within a temperature controlled compartment 77. A temperature control system includes a cooler 79 and a thermistor 81 within the compartment 77. A current in a line 83 from a constant current source (not shown) is passed though the thermistor 81. A voltage drop across the thermistor 81 is compared by differential amplifier 85 with that set by the user through a potentiometer 87. The potentiometer sets the temperature that is desired to be maintained within the compartment 77. An output of the amplifier 85 controls a variable current source 89 which supplies the cooler 79. A physical arrangement for that shown schematically in FIG. 3 is described below with respect to FIGS. 8–10.

Figure 5:
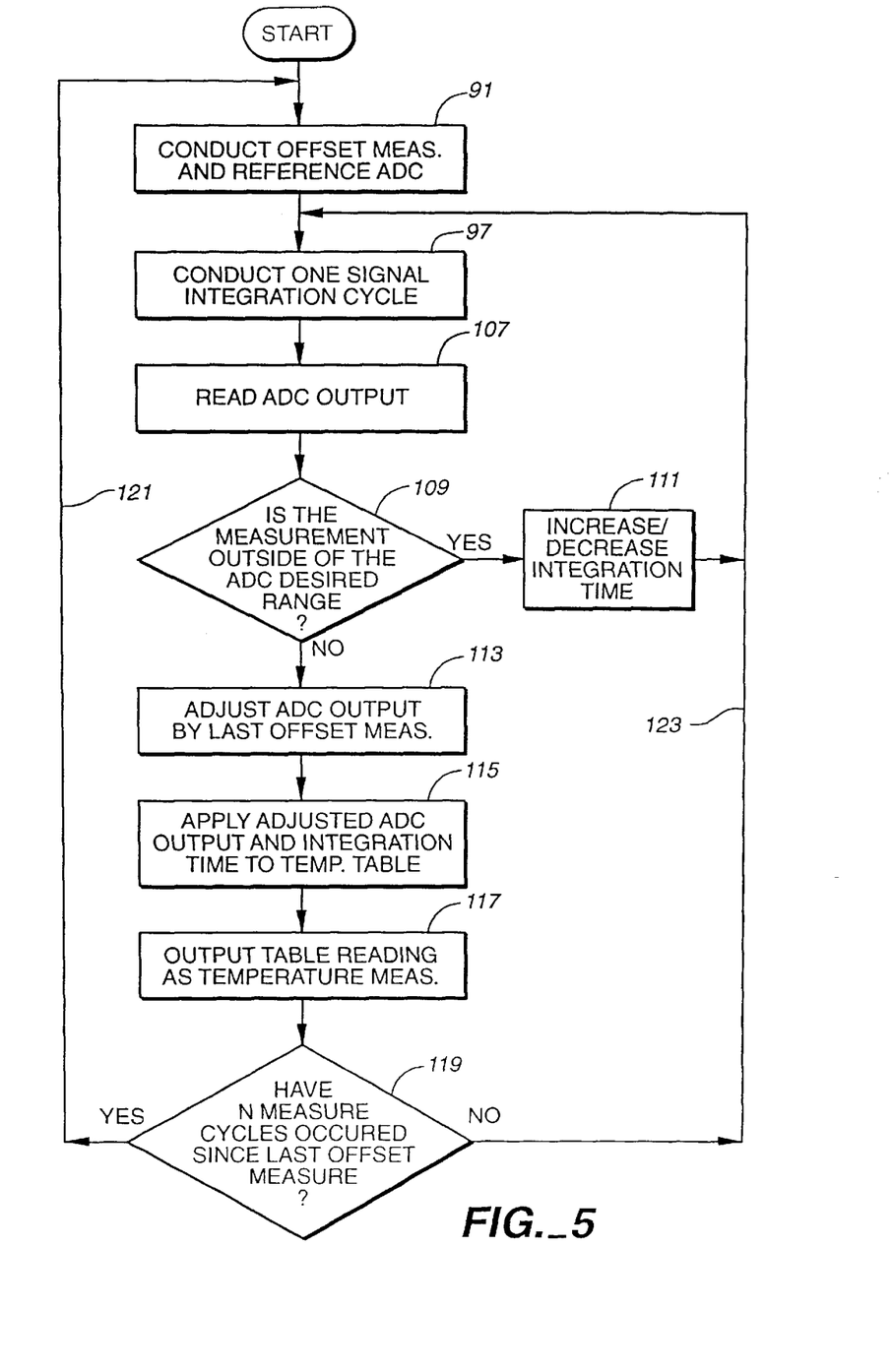
FIG. 5 is a flowchart which illustrates operation of the electronic system illustrated in FIGS. 3 and 4A–4F.

Operation of the integrating circuit described with respect to FIG. 3 to perform an automatic gain control (AGC) function will be described with respect to FIGS. 4 and 5. A step 91 of the processing flowchart of FIG. 5 calls for making the periodic offset and reference measurements. The offset measurement occurs during interval 93 (FIG. 4). During this interval, the select switches 57 (FIG. 4C) and reset switch 61 (FIG. 4B) are closed while the input hold switch 55 (FIG. 4A) is opened. Thus, any signal generated by the integrating amplifier 53 when no signal is applied is measured, that offset then being used to correct data subsequently acquired.

Figure 4A:
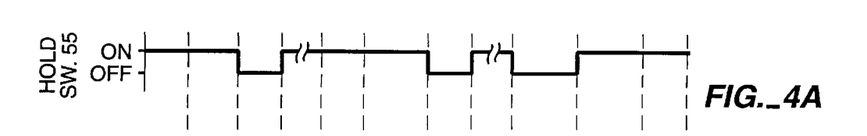
FIGS. 4A–4F are individual signals that exist in the circuit diagram of FIG. 3 and which, taken together, provide a timing diagram of the operation of the circuit of FIG. 3.
Figure 4B:
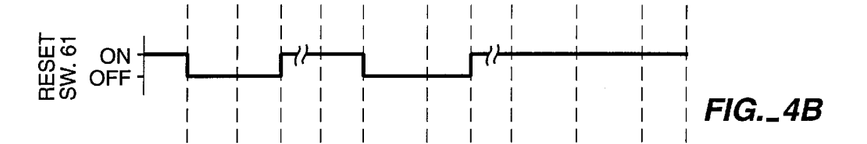
Figure 4C:
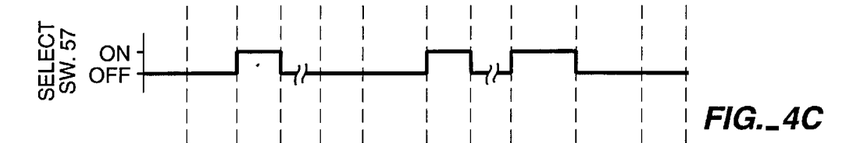
Figure 4D:
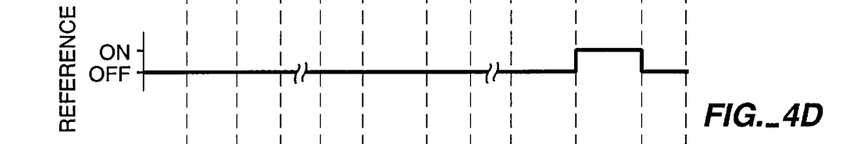

Similarly, as part of the step 91 (FIG. 5), a next interval of time 95 (FIG. 4) is when the gain of the buffer amplifier 71 (FIG. 3) is referenced. During this interval, the reference switch 77 is closed (FIG. 4D) the only time during which switch 77 is in that state. The reference voltage $V_{REF1}$ is connected to the input of the analog-to-digital converter 73. That voltage is, for a typical ADC part, at a positive end of its input window, even though signals are preferably received in a desired range 97 (FIG. 4F) which is a much smaller range than the full input window. After the interval 95, the necessary corrective factors have been determined for a next subsequent number N of temperature measuring samples to be taken before the offset and amplifier gain reference steps are performed again.

Figure 4E:
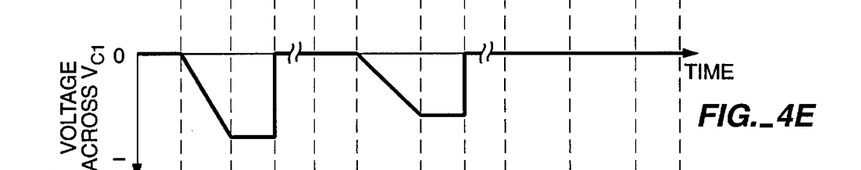
Figure 4F:
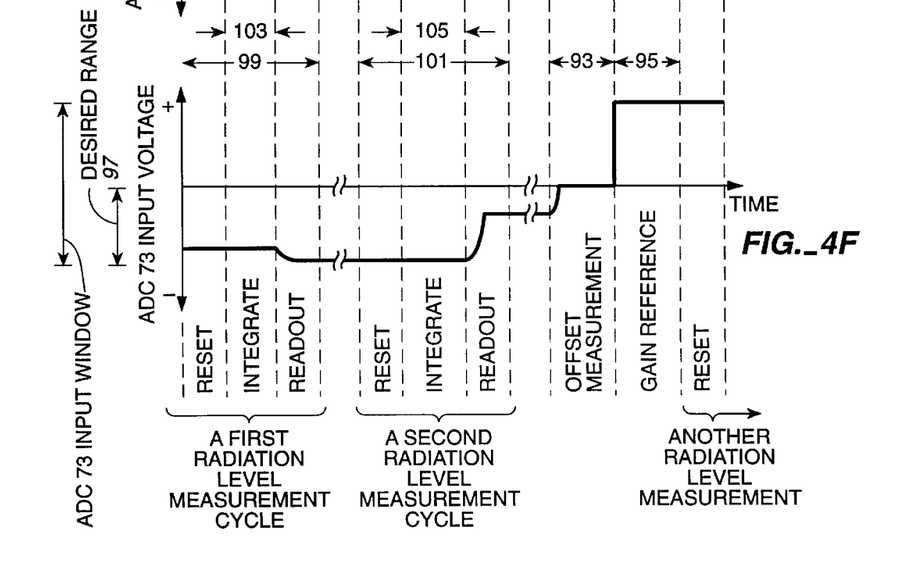

A next step 97 (FIG. 5) then acquires one sample of the magnitude of the incoming optical signal an example of one such cycle occurs during an interval 99, and another example of such a cycle with a different input signal level occurs during an interval 101 (FIG. 4F). In each such cycle, there is a reset period, wherein the reset switch 61 is closed to discharge the capacitor C1 (FIG. 3). That is followed by an integration period, wherein the reset switch 61 is opened and the hold switch 55 is closed to acquire an incoming signal. The duration of the integration interval is controlled by the controller 69 to keep the magnitude of the signal transferred to the capacitor C2, and thus that applied to the input of the analog-to-digital converter 73, within a predetermined range. At the end of the integration portion of each of the intervals 99 and 101, the charge accumulated in the capacitor C1 is transferred in a readout phase to the capacitor C2 by closing the select switch 57 and maintaining the reset switch 61 off. The hold switch 55 is also turned off during this final phase of each of the time intervals 99 and 101.

It will be noted from FIG. 4E, that the example being illustrated has a higher input signal level during the interval 99 than during the interval 101. Thus, an integration time 103 (FIG. 4E) during the interval 99 is less than the integration time 105 during the interval 101. It is the control of the integration time by the controller 69 (FIG. 3) that provides the automatic gain control. This can be seen from FIG. 4F, the voltage applied to the input of the analog-to-digital converter 73 during each of the intervals 99 and 101 remaining within the desired range 97, even though the input signal is significantly different.

Returning to FIG. 5, a next step 107 results in the output of the analog-to-digital converter 73 in line 75 to be read by the controller 69. A next step 109 compares that output with an output corresponding to the desired input range 97, in order to determine whether it is outside of that range or not. If so, a next step 111 causes the integration time (103 and 105 in the example of FIG. 4) to increase or decrease accordingly to adjust the signal level applied to the input of the analog-to-digital converter 73. Once that adjustment is made, the process cycles back to step 97 to acquire another sample with the new integration time.

On the other hand, if the measurement is within the desired range of the ADC 73, a next step 113 adjusts the measurement received by the last offset measurement. In a step 115, it is the adjusted output of the analog-to-digital converter 73 that is applied by the controller 69 to its internal temperature table for equation. Also applied as an input to such a look-up table or equation is the amount of integration time (103 or 105 in the example of FIG. 4) by which the sample was acquired. An output of that table, indicated in a step 117, then provides a temperature measurement which is made available through outputs 21 and 29 of the controller 69.

As a further step 119 in the processing, it is determined whether a certain number N measuring cycles have occurred since the last time that the offset measurement was made and the amplifier gain referenced If so, the processing returns by a path 121 to repeat the offset and gain reference step 91. If not, the processing returns by a path 123 to step 97 to conduct another measurement cycle as described with respect to the intervals 99 and 101 of FIG. 4.

Figure 6:
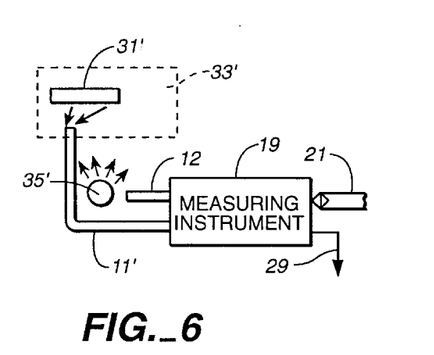
FIG. 6 shows another system in which the various aspects of the present invention can be utilized.

FIG. 6 shows the use of the dual channel instrument illustrated in FIG. 3 for a somewhat different use. A semiconductor wafer 31' within a processing chamber 33' is heated, in this illustrative example, by heating lamps 35'. One of the optical fiber inputs 11' to the measuring instrument 19 receives infra-red emissions from the wafer 31', much as in the system illustrated in FIG. 1B. However, in the application of FIG. 6, the signal captured by the optical fiber 11' also includes radiation reflected by the wafer 31' from the lamps 35'. In order to enable the instrument 19 to separate the temperature dependent infra-red emissions from the reflected radiation, the second input optical fiber 12 acquires a signal from the heating lamps themselves, or from a dummy lamp of the same type which is heating the wafer 31'.

Figure 7A:
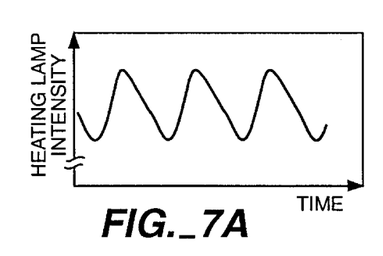
FIG. 7A and 7B are curves which illustrate operation of the system of FIG. 6.
Figure 7B:
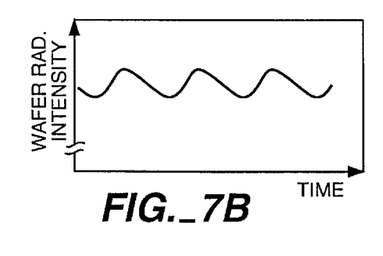

Since the wafer heating lamps 35' are driven by an alternating current, the output intensity has a small ripple that is illustrated in FIG. 7A. The signal of FIG. 7A is acquired by the optical fiber 12. A combined signal illustrated in FIG. 7B is that acquired by the optical fiber 11'. These two signals are initially digitized by the circuit of FIG. 3, the digital samples then being processed to obtain a measure of the temperature or other characteristic of the surface of the wafer 31'. This process is described in U.S. Pat. No. 5,310,260 of Schietinger et al., which is incorporated herein by this reference.

Figure 8:
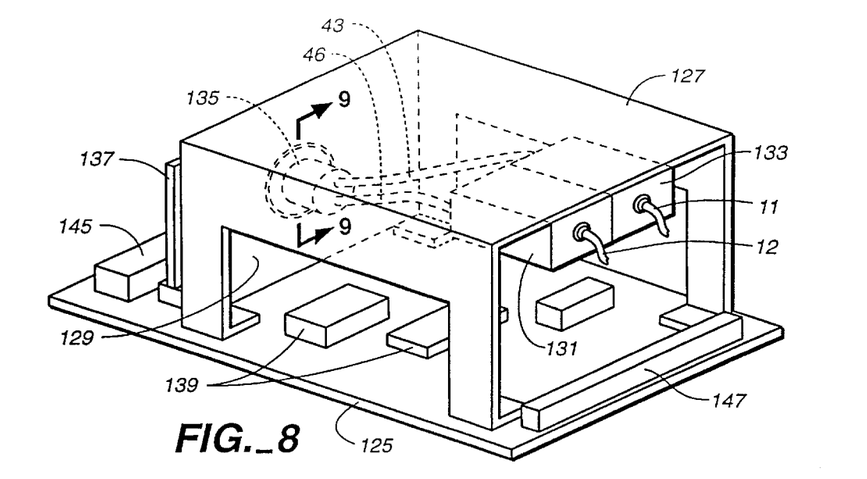
FIG. 8 shows a printed circuit board structure for implementing the front end system of FIGS. 3–5.

A physical arrangement for a main circuit board within the instrument 19 is illustrated in FIG. 8. A usual printed circuit board 125 has a metal shell 127 mounted on it. The shell 127 is generally opened at its bottom sides and ends, except that an end 129 is enclosed. The metal shell 127 is sized to have a thickness and a maximum dimension from the printed circuit board 125 (overall thickness) so that the entire assembly can be inserted into a usual computer system and take the space of no more than three printed circuit board slots.

In addition to providing support for optical assemblies 131 and 133 attached to the top surface of the shell 127, its primary surface is the serve as a heat sink for an enclosure 135 for the integrating circuit chip and photodetectors. A sub-board 137 is carried by the main board 125 in an orientation substantially perpendicular thereto and a short distance away from the end surface 129 of the shell 127. The sub-board 137 carries the capacitor C2, buffer amplifier 71, digital to analog converters 73, reference switch 77, and associated components, all indicated by 138, and interconnections therewith. Similar components for the second channel are also included on the sub-board 137. The sub-board is positioned to be close to and on an opposite side of the shell end wall 129 from the container 137 which forms the chamber 77 in which the integrating circuit chip and photodiodes are positioned. Chips 139 forming the controller 69 are mounted on the main board 125 under the shell 127. Connectors 145 and 147 on opposite ends of the circuit board 125 are selected appropriately for interconnection with whatever system the board of unit of FIG. 8 is to be used.

Figure 9:
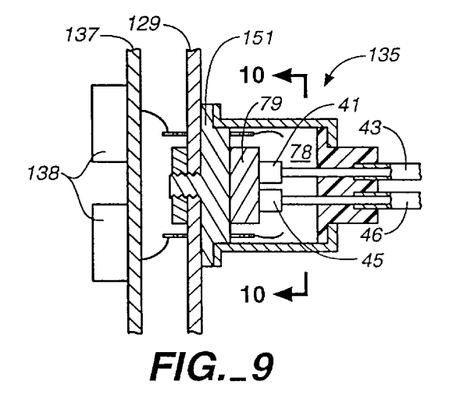
FIG. 9 is a cross-sectional view of a temperature controlled chamber which is provided as part of the configuration of FIG. 8, taken at section 9—9 thereof.
Figure 10:
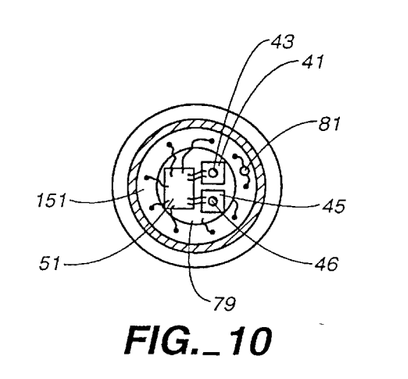
FIG. 10 is a cross-sectional view of the temperature controlled chamber of FIGS. 8 and 9, taken at section 10—10 of FIG. 9.

Referring to FIGS. 9 and 10, the structure of the cooling unit 135 is described. Within its temperature control chamber 77 is the electrically driven cooler 79 which is mounted on a metal heat sink 151. The heat sink 151 is firmly attached to and contacts the metal end 129 of the heat sink shell 127. Thus, heat removed from the compartment 77 by the cooling units 79 is dissipated in the atmosphere by conduction through the heat sink 151 and the wall 129 of the shell 127.

Figure 11:
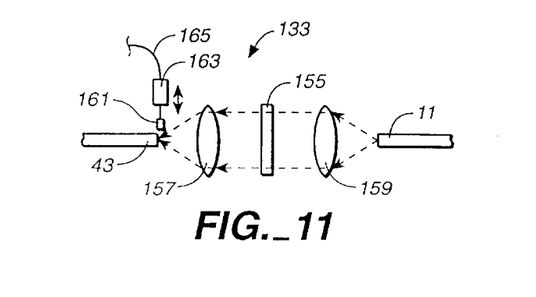
FIG. 11 is an optical diagram which schematically illustrates the structure of another component of the physical system arrangement of FIG. 8.

Each of the optical elements 131 and 133 contains an optical filter 155, as shown in FIG. 11. A pair of lenses 157 and 159, or other convenient optical system, images the infra-red radiation signal from an end of the external optical fiber 11 into an end of the internal optical fiber 43. The purpose of the filter 155 is to limit the bandwidth of the radiation which is allowed to pass onto the associated photodetector. In a case where the temperature of a silicon wafer is being monitored, that wavelength band is preferably a very narrow one with a high wavelength and adjacent one micron.

Optionally, each of the optical units 131 and 133 may also include a shutter 161 that is moveable by a solenoid 163, or other convenient motive force, to a position that closes off an end of the optical fiber 43. If all the radiation is blocked from entering the optical fiber 43, the offset measurement made during the interval 93 (FIG. 4) is then modified to be made with the hold switch 55 in a closed position (on). Thus, the photodetector 41 is included in the offset measurement. The shutter 161 would at all other times be removed from the end of the optical fiber 43. The shutter 161 is so operated by a signal in a line 165 from the controller 69.

It will be noted from FIGS. 8 and 9 that the internal optical fibers 43 and 46 communicate between the optical units 131, 133 and respective photodetectors 45, 41. The ends of these fiber links are abutted directly against their respective photodetectors. This arrangement prevents the introduction of unwanted optical signals into the system and avoids cross-talk between the two channels.

Although the various aspects of the present invention have been described with respect to its preferred embodiments, it will be understood that the invention is entitled to protection within the scope of the appended claims.

It is claimed:

1. A measuring system, comprising:

a main printed circuit board, a metallic shell mounted on one side of said main board, said shell having a surface removed from and parallel with said board one side and which extends to at least one contiguous end surface oriented substantially perpendicularly with said board one side, a cooling unit attached to said shell end surface in a manner to use said shell as a heat sink, means including a temperature sensor within the cooling unit for maintaining uniform the temperature within the cooling unit, at least one photodetector mounted within said cooling unit and having an electrical signal output, a length of optical fiber mounted with one end thereof held against said photodetector, whereby the signal output of said photodetector corresponds to an optical signal directed along said optical fiber, an integrated circuit chip mounted within said cooling unit, said chip including at least one signal integrator which is connected with the photodetector output to repetitively integrate samples of the photodetector signal output and provide said integrated samples at an output of the integrator, electronic circuit means receiving the integrator output from the integrator chip for processing said integrated samples, said circuit means being mounted on a printed circuit sub-board carried by said main board in a position adjacent said shell end surface, means receiving the processed integrated samples for controlling operation of at least the integrator chip and providing an electrical signal related to said optical signal, said controlling means being mounted on said one side of the main board under the shell.

* * * * *